United States Patent
Kulnick et al.

(10) Patent No.: US 9,729,638 B2
(45) Date of Patent: Aug. 8, 2017

(54) CONTROLLER IN A MOTOR VEHICLE, MOTOR VEHICLE AND METHOD FOR EMERGENCY COMMUNICATION

(71) Applicant: AUDI AG, Ingolstadt (DE)

(72) Inventors: Sascha Kulnick, Buxheim (DE); Volker Seemann, Ingolstadt (DE); Niels-Stefan Langer, Dachau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/109,328

(22) PCT Filed: Feb. 6, 2015

(86) PCT No.: PCT/EP2015/000248
§ 371 (c)(1),
(2) Date: Jun. 30, 2016

(87) PCT Pub. No.: WO2015/139800
PCT Pub. Date: Sep. 24, 2015

(65) Prior Publication Data
US 2017/0034278 A1    Feb. 2, 2017

(30) Foreign Application Priority Data
Mar. 20, 2014 (DE) .......................... 10 2014 003 945

(51) Int. Cl.
*G05B 23/02* (2006.01)
*H04L 29/08* (2006.01)
(Continued)

(52) U.S. Cl.
CPC ............. *H04L 67/12* (2013.01); *G08G 1/205* (2013.01); *H04W 4/22* (2013.01); *H04L 67/42* (2013.01); *H04W 88/02* (2013.01)

(58) Field of Classification Search
CPC ......... H04L 67/12; H04L 67/42; G08G 1/205; H04W 4/22; H04W 88/02
(Continued)

(56) References Cited

U.S. PATENT DOCUMENTS 4,717,904 A    1/1988  Murakami
6,954,135 B1 * 10/2005  Yoshioka ................ B60R 25/04
340/426.2
(Continued)

FOREIGN PATENT DOCUMENTS

CN    102753397    10/2012
CN    103632492    3/2014
(Continued)

OTHER PUBLICATIONS

Chinese Office Action dated Dec. 15, 2016 from Chinese Patent Application No. 201580002891.7, 6 pages.
(Continued)

*Primary Examiner* — Naomi Small
(74) *Attorney, Agent, or Firm* — Staas & Halsey LLP

(57) ABSTRACT

A communication device for wireless communication in a mobile radio network is included in a controller installed in a motor vehicle. The controller also includes a connection device which connects to at least one bus system of the motor vehicle and a computer device for controlling the exchange of data between the at least one bus system and the mobile radio network and/or an external network. The communication device has, in addition to a connection to a controller-external mobile radio antenna, an additional mobile radio antenna which is integrated into the controller and is to be used in the event of failure of the controller-external mobile radio antenna. The communication device outputs an emergency call signal to the mobile radio network
(Continued)

when an emergency trigger signal is received via the bus system and/or some other communication connection.

17 Claims, 2 Drawing Sheets

(51) Int. Cl.
  *G08G 1/00*  (2006.01)
  *H04W 4/22*  (2009.01)
  *H04L 29/06*  (2006.01)
  *H04W 88/02*  (2009.01)

(58) Field of Classification Search
  USPC .......................................................... 340/3.44
  See application file for complete search history.

(56) References Cited

U.S. PATENT DOCUMENTS

| | | | |
|---|---|---|---|
| 8,781,442 B1* | 7/2014 | Link, II | G08G 1/205 370/338 |
| 9,161,195 B1* | 10/2015 | Nix | H04W 4/22 |
| 2005/0049021 A1 | 3/2005 | Nedelcu et al. | |
| 2005/0096007 A1 | 5/2005 | Lappe et al. | |
| 2010/0117869 A1* | 5/2010 | Rieth | G08G 1/205 340/989 |
| 2010/0130161 A1* | 5/2010 | Stahlin | G08B 25/012 455/404.1 |
| 2010/0164790 A1 | 7/2010 | Wisnewski et al. | |
| 2011/0207476 A1 | 8/2011 | Qahwash et al. | |
| 2013/0144483 A1 | 6/2013 | Dabholkar | |

FOREIGN PATENT DOCUMENTS

| | | |
|---|---|---|
| DE | 10 2008 048 331 A1 | 5/2009 |
| DE | 10 2010 007 170 A1 | 10/2010 |
| DE | 10 2011 116 430 A1 | 4/2012 |
| DE | 10 2014 003 945.5 | 3/2014 |
| EP | 2 127 964 A2 | 12/2009 |
| EP | 2 128 841 A1 | 12/2009 |
| WO | PCT/EP2015/000248 | 2/2015 |

OTHER PUBLICATIONS

German Office Action dated Oct. 30, 2014 from German Patent Application No. 10 2014 003 945.5, 7 pages.
International Search Report dated May 11, 2015 from PCT Patent Application No. PCT/EP2015/000248, 4 pages.
International Preliminary Report on Patentability dated Sep. 22, 2016 from International Patent Application No. PCT/EP2015/000248, 7 pages.

\* cited by examiner

CONTROLLER IN A MOTOR VEHICLE, MOTOR VEHICLE AND METHOD FOR EMERGENCY COMMUNICATION

CROSS REFERENCE TO RELATED APPLICATIONS

This application is a U.S. national stage of International Application No. PCT/EP2015/000248, filed on Feb. 6, 2015. The International Application claims the priority benefit of German Application No. 10 2014 003 945.5 filed on Mar. 20, 2014. Both the International Application and German Application are incorporated by reference herein in their entirety.

BACKGROUND

Described herein is a controller in a motor vehicle, having a communication device for wireless communication in a mobile radio network, a connection device which connects to at least one bus system of the motor vehicle and a computer device for controlling the exchange of data between the at least one bus system and the mobile radio network and/or an external network, in particular the Internet, which can be reached via the mobile radio network. In addition, described herein are a motor vehicle having the controller and a method for emergency communication in a motor vehicle that is performed using the controller.

In modern motor vehicles, it is becoming more and more customary to also connect them to external networks, in particular to the Internet. In this way, not only can comfort be ensured but also current information which is directly connected to navigation of the motor vehicle, for example information relating to the state of the road, weather conditions and the like can be obtained. In this context, the connection to the Internet is usually made via a mobile radio network.

In order to make such an on-line connection to an external network, it is known to provide a controller, which can be referred to, for example, as an "on-line connectivity unit" (OCU). A communication device, which can be implemented, for example, as a telephone module with an antenna and corresponding electronics, can also be present in such a controller or can be connected thereto. Such communication modules are frequently also referred to as a "network access device" (NAD). A connection from the controller to other vehicle systems is implemented via a bus system of the motor vehicle, modern motor vehicles frequently having multiple vehicle buses (bus systems). Consequently, the controller usually has a connection to one of these bus systems in order to be able to transfer data received from the network to other vehicle systems or to receive data which is directed to the network from these other vehicle systems and pass on the data to the communication device.

An automatic emergency call system for motor vehicles, which is planned by the European Union, is known by the name "eCall" (short for "emergency call"). In this context there is provision for additional controllers to be used in the vehicle, which controllers automatically transmit an emergency call signal to the standard European emergency call number 112 in an emergency, for example in the case of a traffic accident. In addition to this, emergency call systems have been proposed which are known by the name "private emergency call". In this context, the call is not made directly to the emergency call number but instead to a call center, in which, for example, employees with different language capabilities and the like are ready for the callers and can deal with them by telephone via a voice connection. A further employee of the call center passes on the information to the official emergency call number and therefore sets the rescuing process in motion. Specific controllers have also been proposed for such private emergency call systems.

Generally, these special additional controllers utilize a mobile radio antenna which is installed in the motor vehicle, for example in the region of a window, in order to output the emergency call signal and, if appropriate, set up the voice connection to the call center or the official emergency call number. Such a mobile radio antenna can be arranged, for example, on a window root display.

Such a solution is optimum neither with respect to the functional reliability nor with respect to installation space and costs. If, for example in the event of a traffic accident, the mobile radio antenna which is located on the outside fails, it would no longer be possible to emit the emergency call signal; the same applies under the event of a failure of the electrical power in the motor vehicle and the like.

SUMMARY

The controller described herein is therefore based on an emergency call functionality in the motor vehicle which is improved compared to the above.

Described below is a controller including a communication device that has, in addition to a connection to a controller-external mobile radio antenna, an additional mobile radio antenna which is integrated into the controller and is to be used in the event of failure of the controller-external mobile radio antenna and the same communication device is designed to output an emergency call signal to the mobile radio network when an emergency trigger signal is received via the bus system and/or some other communication connection.

Described herein, on the one hand, is a controller which is already provided in the motor vehicle and is designed in any case to establish a connection to the mobile radio network and is modified to the effect that an emergency communication functionality, in particular a private emergency call functionality and/or eCall functionality is also provided by the controller. However, on the other hand, this controller which is present in any case, for example an OCU—on-line connectivity unit—is supplemented with an additional mobile radio antenna which can be used if the actual mobile radio antenna of the motor vehicle, which mobile radio antenna is arranged externally to the controller, is not available. As a result of the first measure, a relatively high level of integration within the motor vehicle is achieved in that new additional hardware is largely avoided and installation space and costs can be saved. With the use of the controller which is intended to connect the motor vehicle in any case to external networks, in particular the Internet, a structural unit is used which is usually arranged in a region of the motor vehicle which is as crash-proof as possible, and therefore a contribution to increasing the safety is also provided in this respect.

The second measure, which is directly related to the first measure, concerns the provision of the additional mobile radio antenna. While the reception conditions are worse in the interior of the motor vehicle, in particular in the interior of the passenger compartment, than, for example, in a position adjacent to a window of the motor vehicle, where the controller-external mobile radio antennae are frequently arranged, it is, however, nevertheless possible still to output an emergency call signal by using an advantageous antenna which does not make any excessively high requirements in terms of the transmission quality, and consequently to ensure that the rescue forces are informed as quickly as possible in the case of an emergency, for example an accident, via the intermediate step of a call center in the case of a private emergency call system, even if the controller-external mobile radio antenna is no longer available, for example as a result of damage to the motor vehicle. In this context, as already mentioned, the provision of such an additional mobile radio antenna which does not have to meet the quality requirements of the controller-external mobile radio antenna is possible without problems and in an advantageous way.

In summary, the controller described herein consequently provides double use of a controller, on the one hand for establishing a connection to a network, on the other hand, however, to implement an emergency communication, wherein the controller may be installed in a crash-proof fashion. Since an emergency mobile radio antenna is also present in the form of the additional mobile radio antenna directly in the controller, the components are present in an encapsulated form in the crash-proof region, in order to permit the emergency communication.

This concept can be expediently expanded further if the controller also has a power source, in particular a battery, to be used in the event of failure of an external power supply. Then, even in the event of a failure of the other electrical power supply of the motor vehicle it is still possible to output an emergency call signal, since a power supply which is to be used only in an emergency is integrated into the controller. The power source may be a battery, in particular an accumulator. In this way, overall, an autonomous controller for the emergency communication is ultimately provided, which controller serves additionally as an interface of the motor vehicle to a motor-vehicle-external network, in particular the Internet.

An embodiment described below provides that the controller also has an additional GPS antenna which is provided in particular in addition to a further GPS antenna of the motor vehicle and is connected to the communication device. This configuration is expedient if the motor vehicle did not previously contain any possible way of determining the position by using GPS, which made it possible to derive position information which could expediently be integrated into the emergency call signal. However, in cases in which the motor vehicle is already provided with a further GPS antenna, it may also be expedient to provide an additional GPS antenna in the controller, since the further GPS antenna of the motor vehicle which is present in a controller-external fashion may, as in the case of the mobile radio antenna, also experience a failure or be impossible to reach.

Generally, there may be provision that in the case of an additional GPS antenna which is integrated into the controller and/or in the case of position data received via the bus system, the communication device is designed to determine and output an emergency call signal containing position information of the motor vehicle. If the motor vehicle has, for example, a navigation system or some other vehicle system which in any case determines position data of the motor vehicle by using the further GPS antenna, the data can be passed onto the controller via the bus system and correspondingly integrated into the emergency call signal at the controller, since the position information constitutes extremely important additional information for the rescue forces in order to reach the location of the accident or of the emergency as quickly as possible. If this data source fails or if a GPS antenna is provided in any case only within the controller, the additional GPS antenna of the controller can also be used to carry out a position determination and to add the position information to the emergency call signal, which also continues to ensure the independent functioning of the controller.

Consequently, a controller with its own power source, an additional GPS antenna and an additional mobile radio antenna is an embodiment described herein, since the controller can then autonomously generate information and compile and output the emergency call signal.

In addition to position information, further useful information can, of course, also be contained in the emergency call signal, for example information on the severity of the accident, on the functional status of the doors and/or whether or not they are closed, on the direction of travel at the time of the emergency, an identification of the motor vehicle and the like.

The communication device can have a connection for a controller-external microphone and/or a controller-external loudspeaker and be designed to establish a voice connection to a private and/or official emergency call number with the outputting of the emergency call signal. A private emergency call number can be assigned here, for example, to a call center. In this context, the communication device can expediently have an amplifier unit which is connected upstream of the loudspeaker in order to permit sufficient output sound volume in the motor vehicle. While it is basically conceivable also to integrate a microphone and a loudspeaker into the controller itself, this may be less desirable since the installation location will make this appear an unfavorable arrangement in most cases. Consequently, controller-external microphones and loudspeakers are used, wherein it is perfectly possible to provide that devices which are already provided in the motor vehicle are used as the loudspeaker and microphone. If an independent method of functioning of the controller is to be ensured, it may be expedient to assign the loudspeaker and the microphone exclusively to the controller, and consequently, under certain circumstances, to add an additional loudspeaker and an additional microphone for the controller.

In one configuration described herein it may be provided that the controller is a networking controller with the connection device, which connects to a plurality, or all, of the bus systems which are provided for communicating between different vehicle systems, and with the computer device which is designed to control the exchange of data between the bus systems and between the bus systems and the network. In this way, "routing" is consequently also carried out between different bus systems of the motor vehicle by using the controller, wherein such networking controllers are also known as "gateway controllers". In this configuration, the emergency communication functionality is consequently added to a central communication node of the motor vehicle, with the result that the integration can be increased further. In particular, an emergency communication unit which is implemented in the controller can then also receive, in a selective fashion, information from a plurality of bus systems, for example position data from a navigation system and the like.

Here the additional advantages of integration of the networking controller and the connection to the external network are for example that a connection is present to all the vehicle buses and consequently data from the network can be fed directly onto the target bus system. Consequently, a broadband connection is provided. If a special controller, which is connected only to a single bus system, for example a CAN bus, were used, the entire traffic to and from the external network would have to run via this one bus system, which would be too heavily loaded, since most bus systems are limited in their bandwidth. If there is a need for communication between the external network and another bus system, when there is one controller connected to just one bus system it would be necessary to keep two vehicle buses "awake", with the result that a relatively high quiescent current would be produced. In the case of the integrated solution presented here, an improved quiescent current behavior can therefore be achieved. The integration additionally provides a potential for monetary savings, since certain hardware components are no longer required.

One expedient development provides that the computer device and the communication device are connected via an SPI connection and/or a USB connection and/or an emergency connection which is specially provided for this purpose, for transmitting an emergency trigger signal to the communication device. In an embodiment, on the one hand, there is a data connection between the computer device and the communication device, for example an SPI connection, but additionally also an emergency connection is present as a dedicated, separate line which serves solely the purpose of passing on the emergency trigger signal to the communication device, which can correspondingly output the emergency call signal. In this case, instantaneous transmission is ensured even when a buffer system or the like is used for the data connection, with the result that the functional reliability of the emergency communication is increased further.

Described herein is a motor vehicle including a controller as described herein, the mobile radio antenna and the at least one bus system. The motor vehicle can include the GPS antenna, the microphone and the loudspeaker.

A configuration described herein also provides that the controller is arranged in a crash-proof region of the motor vehicle, for example, in the region of the passenger compartment, for example, underneath a rear seat bench. In this way, the emergency communication functionality is implemented by using a controller which is located in a region which is as far as possible protected in the event of accidents, with the result that the functionality can be ensured to the highest possible degree, even in the event of relatively serious accidents. In terms of the installation space, an arrangement underneath a rear seat bench is particularly favorable, wherein, of course, other positions within the passenger compartment which is usually implemented in a particularly crash-proof fashion are also conceivable.

The motor vehicle can also have an emergency operator control element which can be reached, in particular, from a driver seat and/or a safety monitoring device for generating an emergency trigger signal for the communication device. While it is consequently on the one hand conceivable that the emergency trigger signal is triggered when an emergency operator control element, for example an SOS button is activated, and is transmitted to the communication device in the controller, a safety monitoring device is usually provided alternatively or additionally to the emergency operator control element, which safety monitoring device checks whether an emergency is occurring and outputs the emergency trigger signal to the controller in the case of an emergency. The safety monitoring device can, for example, check whether the motor vehicle has collided with another object and/or whether safety systems have been triggered, for example airbags have been fired, seat belt pretensioners activated and the like.

In this context it is particularly expedient if the emergency operator control element and/or the safety monitoring device are connected to the controller by using a communication connection, in particular a signal line, which is specially provided for this purpose. In this case, the communication capability via bus systems does not necessarily have to be present any longer in order to transmit the emergency trigger signal correctly, which further increases the robustness of the functioning in the event of accidents.

Finally, described herein is a method for emergency communication in a motor vehicle is performed using the controller described herein. This method is distinguished by the fact that when an emergency trigger signal is received, it is checked whether a mobile radio antenna which is external to the controller can be reached, wherein, when there is an external mobile radio antenna which cannot be reached, the additional mobile radio antenna is used to transmit an emergency call signal to a private and/or official emergency call number. Of course, the statements relating to the controller described herein and to the motor vehicle described herein also apply to the method described herein. Consequently, if the mobile radio antenna, which is mainly used and which provides high quality, of the motor vehicle fails, the additional mobile radio antenna which is integrated into the controller can be used in order nevertheless to output an emergency call signal.

Such checking can take place even if an additional GPS antenna is present in the controller and the motor vehicle has a further GPS antenna. If the corresponding controller-external data source does not supply any position data, the additional GPS antenna which is integrated into the controller can be used in order nevertheless to determine position information which is added to the emergency call signal. It is to be noted that it is also perfectly conceivable to receive position data from another vehicle system on a regular basis and to store the data within the controller, wherein the position information which is received last can be used for the emergency call signal when the controller does not contain an integrated additional GPS antenna.

BRIEF DESCRIPTION OF THE DRAWINGS

Further advantages and details of the exemplary embodiments are described below, and with reference to the drawings, in which.

DETAILED DESCRIPTION OF THE PREFERRED EMBODIMENT

Figure 1:
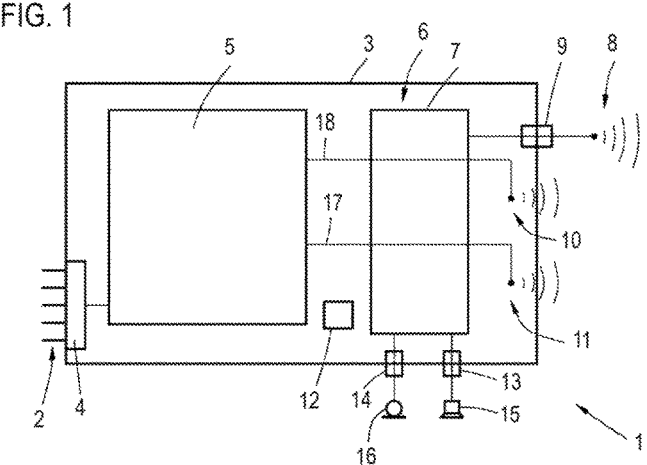
FIG. 1 is a block diagram of a controller.

Reference will now be made in detail to the preferred embodiments, examples of which are illustrated in the accompanying drawings, wherein like reference numerals refer to like elements throughout.

FIG. 1 shows a basic diagram of a controller 1, which is embodied here as a networking controller ("gateway"), and consequently also controls the routing between different bus systems 2 of the motor vehicle in which it is installed. A housing 3 of the controller 1 has a connection device 4 for the bus systems 2, wherein all the vehicle buses 2 which serve to carry out communication between the different vehicle systems are connected to the controller 1. A computer unit 5, which controls, inter alia, the exchange of data between the bus systems 2, is provided inside the housing 3.

However, the controller 1 also performs the functions of an on-line connectivity unit—OCU, consequently of establishing a connection to a motor-vehicle-external network, in particular the Internet, for which purpose a communication device 6, which is embodied here as a telephone module 7, is also provided inside the housing 3. The telephone module 7 can also be referred to as a mobile radio module or network access device—NAD. The computer unit 5 is also designed to control the exchange of data between the bus systems 2 and the motor-vehicle-external network.

The controller 1 can consequently also be referred to as a "connected gateway".

However, a third functionality, specifically an emergency communication functionality, is also implemented in the controller 1. The communication device 6 is consequently designed to output an emergency call signal to the mobile radio network, in this case specifically an emergency call number, when an emergency trigger signal is received. The emergency call number can be that of a private call center in the case of a private emergency call system, but can also be the official emergency call number.

The customary exchange of data in the mobile radio network and the motor-vehicle-external network takes place via a controller-external mobile radio antenna 8 which can be arranged, for example, in the region of the window root of a front window. The controller 1, specifically the communication device 6, may be connected to the controller-external mobile radio antenna 8 via a connection 9.

Since, under certain circumstances, the mobile radio antenna 8 fails or cannot be reached in an emergency, into the controller 1 an additional mobile radio antenna 10 is additionally integrated. Lower quality requirements are made of the additional mobile radio antenna 10 than of the controller-external mobile radio antenna 8.

Furthermore, an additional GPS antenna 11 is integrated into the controller 1, with the result that position determination can also be carried out by using the communication device 6 if position determination is not possible externally or position data of a controller-external vehicle system is not available.

In order to also be able to perform the emergency communication functionality autonomously in other ways, a power source which is designed as a battery 12 is also installed in the controller 1. An emergency call signal can therefore also be output independently of an external power supply.

In order also to be able to implement a voice connection to an emergency call number via the controller 1, the controller 1 additionally has connections 13, 14 with which the communication device 6 can be connected to an external loudspeaker 15 and an external microphone 16.

Between the computer device 5 and the communication device 6 there are two connections, specifically, on the one hand, an SPI connection 17 which serves as a data connection, and, on the other hand, as a dedicated line, an emergency connection 18 via which an emergency trigger signal, which may have been received, for example, via a system 2, can be passed on directly to the communication device 6, in order to bring about the outputting of the emergency call signal and the establishment of a voice connection.

Figure 2:
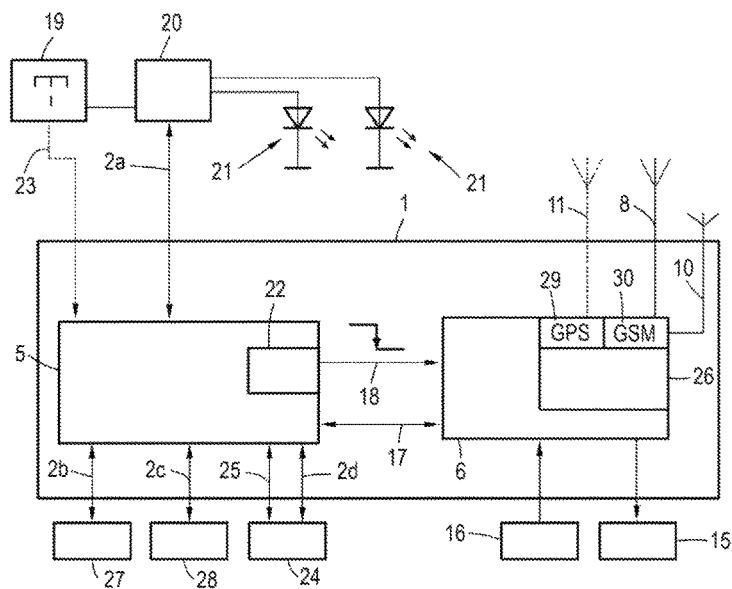
FIG. 2 is a functional block diagram of the controller.

More precise details on the embedding of the "connected gateway", described in FIG. 1, into the overall functionality with respect to the emergency communication are shown in FIG. 2.

Accordingly, an emergency trigger signal can be generated in two different ways. On the one hand, an emergency operator control element 19, the activation of which can be detected by a controller 20 assigned to the emergency operator control element, is provided in the motor vehicle. The controller 20 can also actuate corresponding LEDs 21 which indicate the status of the emergency communication. The emergency trigger signal which is produced when the emergency operator control element 19 is activated passes via a first bus system 2a, for example a LIN bus or a CAN bus, into the controller 1, in this exemplary embodiment firstly to the computer device 5, connected to the bus systems 2, in the controller 1, the computer device 5 having an emergency communication IO unit 22 which passes on the signal to the communication device 6 via the emergency connection 18. Exemplary embodiments are conceivable in which a direct signal line 23, indicated here by dashed lines, runs from the emergency operator control element 19 to the controller 1, specifically the computer device 5.

A second possible source for an emergency trigger signal is a safety monitoring device 24 which can, for example, determine whether an accident, for example a collision, has taken place and/or whether safety systems have been triggered, for example an airbag system and/or a seat pretensioning system. Input data can be evaluated with respect to trigger criteria, in order to determine whether an emergency trigger signal is generated. The emergency trigger signal can be transmitted via a bus system 2d, here a FlexRay bus, to the computer device 5 and therefore the emergency communication IO unit 22. In order to increase the safety further, a direct communication connection 25 may also be provided between the safety monitoring device 24 and the computer device 5, in this case a signal line via which the communication takes place by using pulse width modulation.

In both cases, the emergency trigger signal may be received in the communication device 6 by an emergency communication unit 26 which initially compiles the emergency call signal in which a plurality of information items are contained. The items may include not only data relating to the identification of the motor vehicle, data relating to the instantaneous direction of travel, data relating to the time of the emergency, and the like, but also may include position information of the motor vehicle, door state information of the vehicle and further information. This information can also be transmitted via bus systems 2 and the computer device 5 to the communication device 6 and therefore the emergency communication unit 26, which can also be implemented as a software application. For example, a door controller 27 is shown which can supply door state information to the controller 1, via the bus system 2b, in particular a CAN bus. In addition, a navigation system 28 which can supply position data to the controller 1 via the bus system 2c, a further CAN bus, is shown. If this source for position data fails, the controller 1 also has the integrated additional GPS antenna 11, from whose data it is also possible to derive position information for the emergency call signal in a position determining unit 29.

If the emergency call signal is compiled, it is prepared for transmission by using a GSM unit 30, since the GSM standard for mobile radio networks is used here. Of course, the use of other standards, for example UMTS and/or LTE is also conceivable, so that a UMTS unit and/or an LTE unit can correspondingly also be present. It is checked whether the mobile radio antenna 8, that is to say the controller-external mobile radio antenna, can be still be reached. If this is not the case, the additional mobile radio antenna 10 which is integrated into the controller 1 is used instead of the controller-external mobile radio antenna 8. If a voice connection is subsequently established, the loudspeaker 15 and the microphone 16 may be used.

The controller 1 is therefore an audio-enabled and online-enabled gateway on which, an emergency communication function can run with a high degree of safety and reliability given crash-proof installation of the controller 1. In this context, as has been illustrated, various synergies are used in the vehicle architecture, in particular the emergency communication facility is built onto a central node in the motor vehicle communication, which node has in any case the communication device 6.

Figure 3:
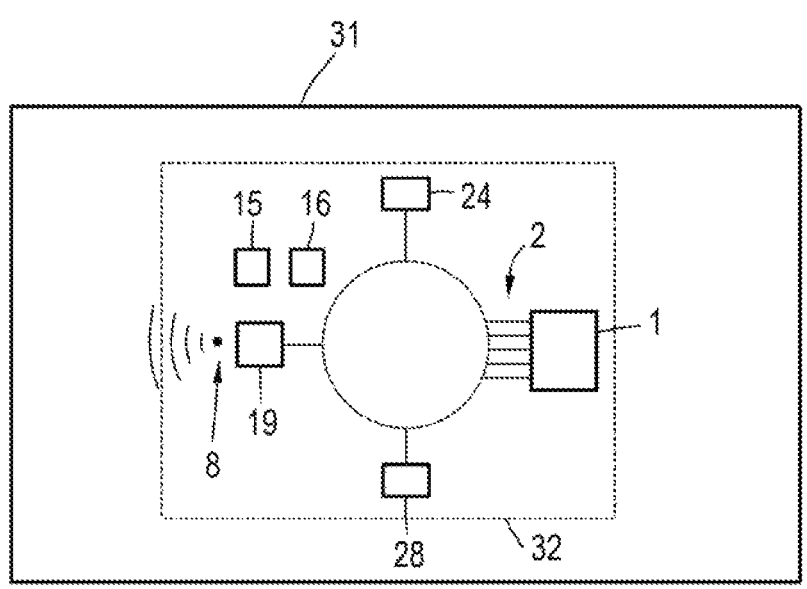
FIG. 3 is a block diagram of a motor vehicle including the controller.

Finally, FIG. 3 shows a basic diagram of a motor vehicle 31 including the controller described herein. A crash-proof region 32 is indicated in the region of the passenger compartment. The controller 1 may be installed in this crash-proof region 32, below a rear seat bench, the controller 1 being provided there, in particular, in the region of a cable intersection of cable routes, in order to have access to the bus systems 2 via which it communicates with, for example, the safety monitoring device 24, the navigation system 28 and the like. Of course, further vehicle systems, such as the door controller 27, may also be provided but are not illustrated in more detail in FIG. 3 for the sake of clarity.

The emergency operator control element 19, which is designed as an SOS button, may be arranged, like the loudspeaker 15 and the microphone 16, in the region of the driver's seat in order to be easily reachable and to permit appropriate voice communication. The controller-external mobile radio antenna 8 may be installed in the region of the window root of a front window.

A description has been provided with particular reference to embodiments thereof and examples, but it will be understood that variations and modifications may be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A networking controller in a motor vehicle having bus systems provided for communications between different vehicle systems, a controller-external mobile radio antenna, and at least one communication connection, the networking controller comprising:
   a controller-internal mobile radio antenna integrated into the networking controller;
   a communication device including an interface configured to connect to the controller-external mobile radio antenna, the communication device being configured to perform wireless communication in a mobile radio network, to output an emergency call signal to the mobile radio network when an emergency trigger signal is received via at least one of the bus systems and/or the at least one communication connection, and to use the controller-internal mobile radio antenna when the controller-external mobile radio antenna fails;
   a connection device connected to the bus systems of the motor vehicle; and
   a computer device connected to the connection device and configured to control an exchange of data between the bus systems and between the bus systems and at least one of the mobile radio network and an external network including the Internet, which can be reached via the mobile radio network.

2. The networking controller as claimed in claim 1, further comprising a power source configured to provide power to the networking controller when an external power supply to the networking controller fails.

3. The networking controller as claimed in claim 2, wherein the power source is a battery.

4. The networking controller as claimed in claim 1, wherein the motor vehicle includes a first global positioning system (GPS) antenna, and
   the networking controller further comprises a second GPS antenna connected to the communication device (6) and integrated into the networking controller.

5. The networking controller as claimed in claim 4, wherein the communication device is configured to output the emergency call signal including position information of the motor vehicle using position data received via one or more of the second GPS antenna and at least one of the bus systems.

6. The networking controller as claimed claim 1, wherein the motor vehicle includes at least one of a controller-external microphone and a controller-external loudspeaker, and
   wherein the communication device further includes at least one interface configured to connect to at least one of the controller-external microphone and the controller-external loudspeaker and is configured to establish a voice connection to an emergency call number with the outputting of the emergency call signal.

7. The networking controller as claimed in claim 1, wherein the computer device and the communication device are connected to one another via at least one of a serial peripheral interface connection, a universal serial bus connection, and an emergency connection provided for transmitting the emergency trigger signal to the communication device.

8. A motor vehicle, comprising:
   a chassis;
   a controller-external mobile radio antenna;
   bus systems configured to for communicate between different vehicle systems and at least one output communication connection; and
   a networking controller including:
      a controller-internal mobile radio antenna integrated into the networking controller;
      a communication device including an interface configured to connect to the controller-external mobile radio antenna, the communication device being configured to perform wireless communication in a mobile radio network, to output an emergency call signal to the mobile radio network when an emergency trigger signal is received via at least one of the bus systems and/or the at least one output communication connection, and to use the controller-internal mobile radio antenna when the controller-external mobile radio antenna fails:
      a connection device connected to the bus systems; and
      a computer device connected to the connection device and configured to control an exchange of data between the bus systems and between the bus systems and at least one of the mobile radio network and an external network including the Internet, which can be reached via the mobile radio network.

9. The motor vehicle as claimed in claim 8, wherein the networking controller is disposed in a crash-proof region of the motor vehicle.

10. The motor vehicle as claimed in claim 9, further comprising a passenger compartment having a rear seat bench,
   wherein the crash-proof region of the motor vehicle is located underneath the rear seat bench of the passenger compartment.

11. The motor vehicle as claimed in claim 8, further comprising:
   a driver seat; and
   at least one of a safety monitoring device and an emergency operator control element which is reachable from the driver seat, the at least one of the safety monitoring device and the emergency operator control element being configured to generate the emergency trigger signal to be transmitted to the communication device.

12. The motor vehicle as claimed in claim 11, wherein the at least one of the safety monitoring device and the emergency operator control element is connected to the networking controller via the at least one output communication connection via a signal line.

13. The motor vehicle as claimed in claim 8, wherein the controller-external mobile radio antenna is installed in a region of a front window of the motor vehicle.

14. The motor vehicle as claimed in claim 8, wherein a quality of the emergency call signal output via the controller-internal external mobile radio is less than the quality of the emergency call signal output via the controller-external mobile radio antenna.

15. A method for emergency communication in a motor vehicle having a controller-external mobile radio antenna, bus systems provided for communications between vehicle systems, and a networking controller which includes a communication device connected via an interface to the controller-external mobile radio antenna, a connection device connected to the bus systems, and a computer device, the method comprising:
controlling, by the computer device, exchange of data between the bus systems and between the bus systems and at least one of a mobile radio network and an external network including the Internet, reachable via the mobile radio network;
determining, when an emergency trigger signal is received by the communication device via at least one of the bus systems and another communication connection, whether the communication device is able to communicate via the controller-external mobile radio antenna; and
when communication via the controller-external mobile radio antenna is unavailable, transmitting an emergency call signal via the mobile radio network from a controller-internal mobile radio antenna integrated into the networking controller to an emergency call number.

16. The method as claimed in claim 15, further comprising providing power to the networking controller using a power source integrated into the networking controller, when the networking controller determines a power supply external to the networking controller has failed.

17. The method as claimed in claim 15, further comprising obtaining position data of the motor vehicle using a global positioning system antenna connected to the communication device and integrated into the networking controller, when the networking controller is unable to obtain position data of the motor vehicle from another source external to the networking controller.

* * * * *

UNITED STATES PATENT AND TRADEMARK OFFICE
CERTIFICATE OF CORRECTION

| | | |
|---|---|---|
| PATENT NO. | : 9,729,638 B2 | Page 1 of 1 |
| APPLICATION NO. | : 15/109328 | |
| DATED | : August 8, 2017 | |
| INVENTOR(S) | : Sascha Kulnick et al. | |

It is certified that error appears in the above-identified patent and that said Letters Patent is hereby corrected as shown below:

On the Title Page

[72] (Inventors), Column 1, Line 13:
In the third Inventor, delete "Dachau" and insert -- Hannover --, therefore.

In the Claims

Column 10, Line 10:
In Claim 6, after "claimed" insert -- in --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*